United States Patent
Karame et al.

(10) Patent No.: US 10,320,561 B2
(45) Date of Patent: Jun. 11, 2019

(54) METHOD FOR PROVIDING ENCRYPTED INFORMATION AND ENCRYPTING ENTITY

(71) Applicant: NEC Europe Ltd., Heidelberg (DE)

(72) Inventors: Ghassan Karame, Heidelberg (DE); Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 15/501,178

(22) PCT Filed: Nov. 4, 2014

(86) PCT No.: PCT/EP2014/073716
§ 371 (c)(1),
(2) Date: Feb. 2, 2017

(87) PCT Pub. No.: WO2016/070910
PCT Pub. Date: May 12, 2016

(65) Prior Publication Data
US 2017/0310478 A1  Oct. 26, 2017

(51) Int. Cl.
*H04L 29/06* (2006.01)
*G06F 21/00* (2013.01)
(Continued)

(52) U.S. Cl.
CPC ........... *H04L 9/0847* (2013.01); *G06F 21/60* (2013.01); *G06F 21/6218* (2013.01);
(Continued)

(58) Field of Classification Search
CPC ........ H04L 9/0847; H04L 9/08; H04L 9/088; H04L 9/0861; H04L 9/0894;
(Continued)

(56) References Cited

U.S. PATENT DOCUMENTS

| | | | | |
|---|---|---|---|---|
| 5,845,008 A | * | 12/1998 | Katoh | G07D 7/12 382/217 |
| 2004/0167860 A1 | * | 8/2004 | Baxter | G06Q 20/0855 705/64 |

(Continued)

OTHER PUBLICATIONS

Shmueli Erez et al: "Designing Secure Indexes for Encrypted Databases", Aug. 7, 2005 (Aug. 7, 2005), Advances in Communication Networking: 20th EUNICE/IFIP EG 6.2, 6.6 International Workshop, Rennes, France, Sep. 1-5, 2014, Revised Selected Papers; [Lecture Notes in Computer Science, ISSN 1611-3349, Springer Verlag, DE, pp. 54-68 XP047304850.

*Primary Examiner* — Lisa C Lewis
(74) *Attorney, Agent, or Firm* — Leydig, Voit & Mayer, Ltd.

(57) ABSTRACT

A method for providing encrypted information by an information entity to one or more operating entities, the information entity having a database for storing encrypted information and the one or more operating entities being configured to operate on the encrypted information, wherein the encrypted information is stored encrypted with an encryption key known to the one or more operating entities includes performing, by an operating entity, a request on the encrypted information, wherein plaintext information to be stored encrypted is provided in tuples, each having ID information, one or more fields with field information specifying the fields, and values, wherein at least the values are encrypted with non-deterministic order preserving encryption with at least one encryption key such that each plaintext value is encrypted into a set of encrypted values, and wherein the set of encrypted values is partitioned into a left set and a right set.

18 Claims, 6 Drawing Sheets

(51) Int. Cl.
*H04L 9/08* (2006.01)
*G06F 21/62* (2013.01)
*G06F 21/60* (2013.01)

(52) U.S. Cl.
CPC ............ *G06F 21/6227* (2013.01); *H04L 9/08* (2013.01); *H04L 9/088* (2013.01); *H04L 9/0861* (2013.01); *H04L 9/0894* (2013.01); *G06F 21/602* (2013.01); *G06F 21/62* (2013.01); *H04L 2209/08* (2013.01)

(58) Field of Classification Search
CPC . H04L 2209/08; G06F 21/6218; G06F 21/60; G06F 21/6227; G06F 21/602; G06F 21/62
See application file for complete search history.

(56) References Cited

U.S. PATENT DOCUMENTS

| | | | |
|---|---|---|---|
| 2008/0172230 A1* | 7/2008 | Hayakawa | G10L 17/14 704/249 |
| 2008/0175390 A1* | 7/2008 | Alessio | G06Q 20/341 380/278 |
| 2011/0004607 A1* | 1/2011 | Lokam | G06F 17/30675 707/759 |
| 2012/0136917 A1* | 5/2012 | Abramson | G06F 9/543 709/203 |
| 2014/0270163 A1* | 9/2014 | Merchan | H04L 9/0637 380/46 |

* cited by examiner

Fig. 5

| ID | PRIORITY | IP SRC | IP DST | PORT SRC | PORT DST | PROTOCOL | ACTION |
|---|---|---|---|---|---|---|---|
| X14d | 57 | 192.168.*.* | 1.2.3.* | * | [4000, 5000] | TCP | port 4 |
| abc | 4 | 192.168.*.* | 1.2.3.* | * | [0, 39999] | UPD | drop |
| X5y | 32 | 192.168.*.* | 1.2.3.4 | ... | [4000, 5000] | TCP | port 5 |
| ... | | | | | | | |

| ID | Z1 | Z2 | Z3 | Z4 | Z5 | Z6 | Z7 | Z8 | Z9 |
|---|---|---|---|---|---|---|---|---|---|
| X14d | 100536 | 22461 | 142 | 145 | 20463 | 133 | 322463 | 42463 | 101465 |
| abc | 100463 | 22457 | 54 | 13 | 20567 | 53 | 321234 | 34 | 101464 |
| X5y | 100901 | 20876 | 99 | 122 | 20833 | 91 | 322833 | 42833 | 101056 |
| ... | | | | | | | | | |

METHOD FOR PROVIDING ENCRYPTED INFORMATION AND ENCRYPTING ENTITY

CROSS REFERENCE TO RELATED APPLICATIONS

This application is a U.S. National Stage Application under 35 U.S.C. § 371 of International Application No. PCT/EP2014/073716 filed on Nov. 4, 2014. The International Application was published in English on May 12, 2016 as WO 2016/070910 A1 under PCT Article 21(2).

FIELD

The present invention relates to a method for providing encrypted information by an information entity (IE) having a database for storing information to one or more operating entities (OE) for operating on said stored encrypted information. The present invention further relates to an encrypting entity.

BACKGROUND

Sharing network resources with user groups, divisions or any other companies in software defined networking (SDN) is gaining increasing attention recently owing to its promises for better network utilization. Resource sharing is effectively realized in SDN by empowering these parties at the control plane with permissions for administrating network components or parts thereof. Different tenants can lease a network slice (and therefore share the network resources) by installing and running their own application atop the network owner's controller using a so-called north-bound application programming interface (API). These different tenants usually share network resources and at the same time might also compete among each other.

Restricting the access of the network users (i.e., the network owner and the leasing tenants) and the applications to the network components emerges as a necessity to ensure the correct operation of the SDN network. Conventional methods and systems (for example as shown in the non-patent literature of R. Sherwood, G. Gibb, K.-K. Yap, G. Appenzeller, M. Casado, N. McKeown, and G. Parulkar, "Can the production network be the testbed?", in Symposium on Operating Systems Design and Implementation (OSDI), 2010; P. Porras, S. Shin, V. Yegneswaran, M. Fong, M. Tyson, and G. Du, "A security enforcement kernel for OpenFlow networks", in Workshop on Hot Topics in Software Defined Networks (HotSDN), 2012; and F. Klaedtke, G. Karame, R. Bifulco, and H. Cui, "Access control for SDN controllers", in Workshop on Hot Topics in Software Defined Networks (HotSDN), 2014) rely on a reference monitor to orchestrate access to the network by the various tenants and to resolve possible conflicts among them.

However, these conventional methods and system require that a central reference monitor learns all the rules installed by all the tenants. The reference monitor should have global knowledge about the rules installed in the SDN in order to make correct access control decisions. However this results in a loss of privacy of the SDN tenants. This is especially evident when the reference monitor implementation is outsourced, e.g., to another executing environment that is not necessarily trusted by tenants. For instance, the reference monitor can be outsourced by one SDN domain to execute by another tenant that administrates some or all of the switches, e.g., in a federated SDN network. Alternatively, the reference monitor could be outsourced to a public cloud server, since service providers providing a reference monitor have considerable incentives to rely on hosted services in the cloud, since this enables them to maximize the availability of the service while minimizing the costs for acquisition of hardware and operation. Indeed, the cloud offers a low barrier for small and medium enterprises to offer services and enables its clients to avoid huge upfront investments to accommodate for peak usage. However, outsourcing a reference monitor raises serious privacy concerns with respect to the leakage of tenant information to the cloud provider or other tenants.

SUMMARY

In an embodiment, the present invention provides a method for providing encrypted information by an information entity to one or more operating entities, the information entity having a database for storing encrypted information and the one or more operating entities being configured to operate on the encrypted information, wherein the encrypted information is stored encrypted with an encryption key known to the one or more operating entities. The method includes performing, by a first of the one or more operating entity, a request on the encrypted information, wherein plaintext information to be stored encrypted is provided in tuples, each having ID information, one or more fields with field information specifying the fields, and values, wherein at least the values are encrypted with non-deterministic order preserving encryption with at least one encryption key such that each plaintext value is encrypted into a set of encrypted values, wherein the set of encrypted values is partitioned into a left set and a right set, wherein each element in the left set is smaller than each element in the right set, and wherein each of the elements in the left set and each of the elements in the right set, upon decryption, results in a corresponding plaintext value, and wherein each value is stored encrypted by using at least one of the left set or the right set.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows schematically the encryption of a flow table encrypted with a method according to an embodiment of the present invention.

DETAILED DESCRIPTION

Figure 1:
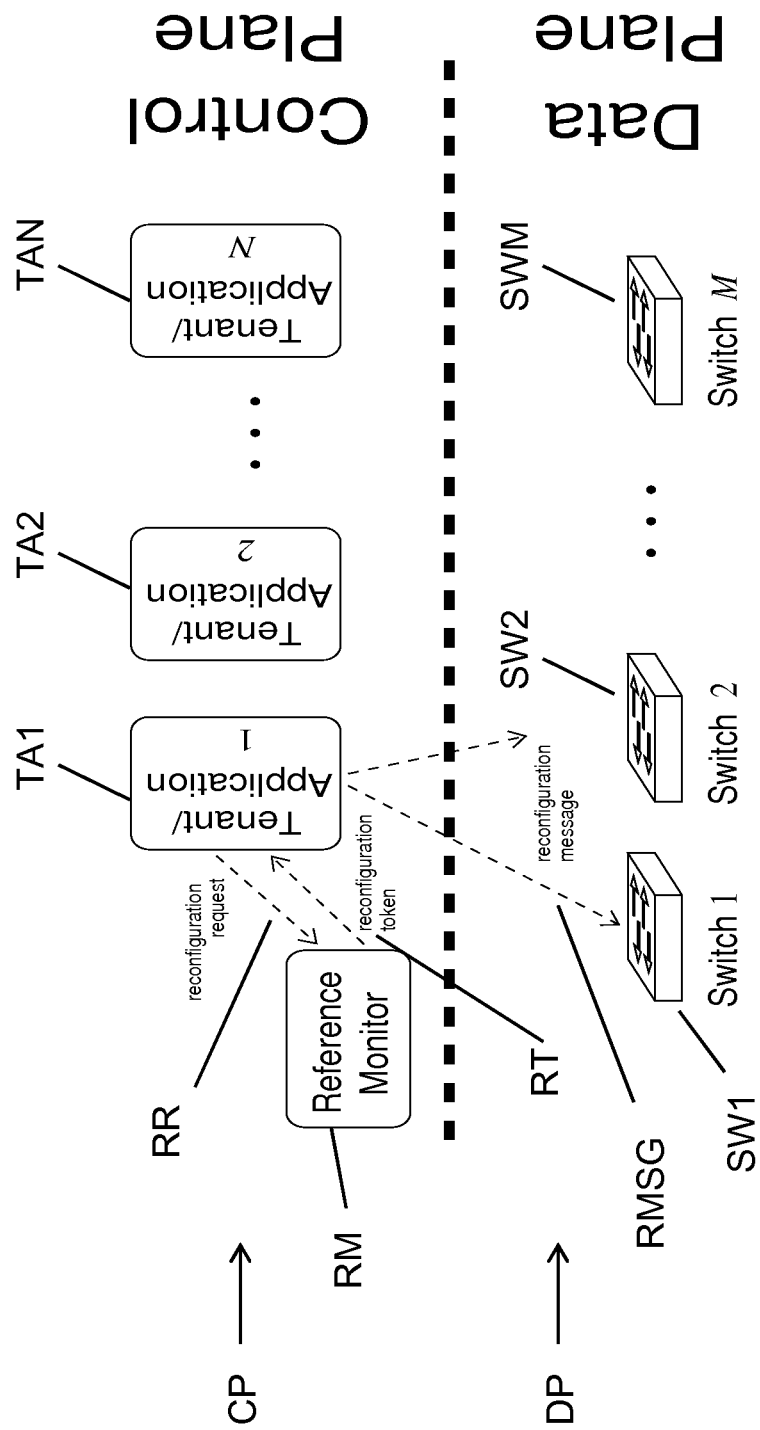
FIG. 1 shows schematically a software defined network on which a method according to an embodiment of the present invention can be performed.

Although applicable in general to any kind of information entity, embodiments of the present invention will be described with regard to tenants or applications for a software defined network. Although applicable in general to any kind of relation between the information entity and operating entities, embodiments of the present invention will be described with regard to the reference monitor of a software defined network as an information entity and tenants/applications as operating entities. Although applicable in general to any kind of other devices, embodiments of the present invention will be described with regard to switches of a software defined network. Although applicable in general to any kind of information, embodiments of the present invention will be described with regard to rules for switches of a software defined network and flow tables for switches of a software defined network.

A method for providing encrypted information and an encrypting entity enabled to perform operations on encrypted data are described herein, wherein the entity storing the data does not learn any meaningful information about tenant identities or about specific information that tenants are storing, requesting, or on which the tenants are operating.

A method for providing encrypted information is described herein which does not require any changes to the implementation of existing information entities providing information.

A method for providing information and an encryption entity are described herein which can be easily implemented and efficiently performed or operated.

An encryption entity leveraging the security of information is described herein.

A method for providing encrypted information and an encrypting entity are described herein for enhancing the flexibility in terms of outsourcing of information.

According to an embodiment, a method is described herein for providing encrypted information by an information entity (IE) having a database for storing information to one or more operating entities (OE) for operating on the stored encrypted information, wherein the information in the database is stored encrypted with an encryption key, wherein the encryption key is known to said OEs, and wherein the request by an OE is performed on the encrypted information, is defined.

According to an embodiment, a method is described herein wherein plaintext information to be stored encrypted is provided in tuples, each having id information, one or more fields with field information specifying the fields and values, wherein at least said values are encrypted with non-deterministic order preserving encryption (ND-OPE) with at least one encryption key, such that each plaintext value is encrypted into a set of encrypted values (SEV), wherein said SEV is partitioned into a left set (LS) and a right set (RS), wherein each element in the LS is smaller than each element in the RS, and wherein each of said elements upon decryption results in the corresponding plaintext value, preferably wherein LS and/or RS are provided in form of a left interval (LI) and a right interval (RI), and wherein each value is stored encrypted by using at least one of LS or RS.

According to an embodiment, an encrypting entity is adapted to provide plaintext information to be stored encrypted in tuples, each having id information, one or more fields with field information specifying the fields and values, wherein at least said values are encrypted with non-deterministic order preserving encryption (ND-OPE) with at least one encryption key, such that each plaintext value is encrypted into a set of encrypted values (SEV), wherein said SEV is partitioned into a left set (LS) and a right set (RS), wherein each element in the LS is smaller than each element in the RS, and wherein each of said elements upon decryption results in the corresponding plaintext value, preferably wherein LS and/or RS are provided in form of a left interval (LI) and a right interval (RI), and wherein each value is stored encrypted by using at least one of LS or RS.

By encrypting entries or values using said non-deterministic order preserving encryption with partitioned left and right values enables an efficient outsourcing of information and entities for performing operations without leaking considerable information about the encrypted entries requested by tenants, for example, in software defined networks and database systems.

An outsourcing of existing off-the-shelf entities in a privacy preserving manner without incurring any change in the implementation of the entities is enabled.

According to an embodiment, an outsourced entity can perform requests, for example can make access control decisions without learning any meaningful information about the specific operations, rules, etc. that each tenant wishes to install, operate, and/or modify.

According to an embodiment of the invention, additional storage and processing overhead can be reduced to a minimum, thus providing a good trade of between privacy and overhead.

According to a preferred embodiment, field information of fields is also encrypted. This further enhances the privacy, since for example a reference monitor can also not learn any information about the fields itself, hardening an attack on the encrypted data.

According to a further preferred embodiment, each value is stored using both LS and RS. This enhances the flexibility when operations like arbitrary Boolean combinations of inequalities are performed enhancing the efficiency as well as the flexibility.

According to a further preferred embodiment, for at least one value the left and right boundary of its LS and/or RS is stored in different fields, wherein the field information of these fields is kept secret. By separating the left and right bounds of the sets, preferably intervals, in separate fields, for example when encrypting rules, the security is further enhanced: Since for example when having a knowledge that a field specifies for example the protocol type, some of the values may become "guessable" after inspecting several encrypted rules that a rule handles TCP or UDP network traffic. The reason is that these values for these protocols usually occur much more frequently.

According to a further preferred embodiment, the encrypted fields are reordered. By reordering or shuffling the fields security is further enhanced, since the effort for analyzing patterns or the operations on the encrypted data as well as on the encrypted data must be increased to get to "guessable" information.

According to a further preferred embodiment, plausibility of requests is checked on the stored encrypted data, preferably wherein one or more policies are also stored encrypted and used for defining plausibility. This enables to check the allowance or plausibility of requests on the encrypted data without having to use plaintext rules. This enables that the information entity does not only learn any meaningful information not only from the requests but also not of policies for access control of the stored encrypted data.

According to a further preferred embodiment, different fields and/or different boundaries of the LS and/or RS are encrypted with different encryption keys. Different fields are then encrypted with different keys, instead of using the same encryption key for all fields. For example the encryption key is then a vector of OPE keys one OPE key for each field. When encrypting also the left and right bounds of the left and right sets with different OPE keys security is even further enhanced: Using different OPE keys for the set or interval bounds enables to smoothen the distribution of values between different fields in an encrypted rule or flow table, etc.

According to a further preferred embodiment, dummy fields and/or dummy values are introduced. By introducing dummy values the security is even further enhanced since the effort is further increased to come to "guessable" information by analyzing the encrypted information and the performed operation on the encrypted information.

According to a further preferred embodiment, said dummy fields and/or dummy values are randomly chosen comprising a dummy indication mark. This enables that dummy elements do not affect the outcome of a request since dummy fields and/or dummy values can be filtered prior to perform an operation. Thus, reliability is enhanced.

According to a further preferred embodiment, values to be encrypted are encrypted such that each value is encrypted n times with n greater than or equal to two using a different encryption key for every encryption of said value and then stored. This further hardens for any attacking entity or even the information entity providing encrypted information to acquire information simply by observing, for example the query log. To avoid that patterns might still reveal information about "popular" information, for example when header information are used such as a popular port number, for example the HTTP-PORT 80, the distribution of the encrypted data is further obfuscated encrypting the information under different keys.

According to a further preferred embodiment, said encryption keys are generated using a one way cryptographic function on a pre-shared common encryption key and an epoch information, preferably in form of a counter, specifying the epoch when a requesting entity switches to another encryption key or encryption key set. This allows in an easy way to generate different encryption keys.

According to a further preferred embodiment the information stored in the database comprise configuring information for other devices connected to and configurable by the OE and/or the IE, wherein upon performing operations on the encrypted data a result is generated and based on this result a configuration allowance token is generated for the OE to allow configuration of one or more of said other devices and/or the IE itself performs said configuration on said other devices. This allows an easy implementation in a software defined network, for example the other devices are switches and the database is provided in a reference monitor where tenants or applications request a reconfiguration of a rule in one or more switches which has to be checked by the reference monitor for allowance.

According to a further preferred embodiment rules for (re)configuring said other devices are included in said configuring information and corresponding rule tables for each of the other devices wherein entries are provided in form of tuples. This further enhances the simplicity to implement the method in software defined networks.

According to a further preferred embodiment an operation on the encrypted information in form of a smaller-than or smaller-than-or equal-to equation is performed by comparing the encrypted value of the LS of the corresponding equation left side value with the encrypted value of the RS of the corresponding equation right side value. This provides in an easy way to enable operations of inequality equations of the form $a<b$ or $a\leq b$.

According to a further preferred embodiment said configuration allowance token is provided in form of a cryptographic timestamped token which is used to mutually authenticate the OE and the other devices to be configured by said OE. For example once a reference monitor of a software defined network processes encrypted rules and verifies that they do not violate any of the encrypted policies the reference monitor can allow the installation of these rules on the destined switches by issuing said timestamped cryptographic token that the tenant or application can present to the corresponding switches and install the rules there. The tenant application can send the token to the switch which can verify that the sent token is well formed, checks the authenticity of the signature of the reference monitor and checks that if the timestamp is "fresh", i.e. if the time for which the token is valid is not yet over. If the aforementioned verification passes then switch decrypts the flow rule(s) and installs it/them.

Fig. shows schematically a software defined network on which a method according to an embodiment of the present invention can be performed. In the following the following model is assumed: an SDN network with data plane (switches) and control plane (reference monitor, multiple tenants/applications); and a multi-tenant/multi-application network with network resources (e.g., switches) shared among different tenants/used by different applications wherein each tenant/application also administrates the resources (e.g., it installs rules in the switches' flow tables).

More specifically, a network is assumed comprising N tenants/applications, M switches, and a reference monitor (RM), which is outsourced to the cloud. It is assumed that the N tenants/applications and the M switches share a group key K among each other. It is assumed that the reference monitor does not know the group key K. Finally, it is assumed that the switches are capable of authenticating the reference monitor (RM)/tenants/applications TA1, TA2, . . . (e.g., all parties know each other's public keys), and encrypting and decrypting messages.

In more detail FIG. 1 shows a plurality of tenants/applications TA1, TA2, . . . , TAN which want to reconfigure switches SW1, SW2, . . . , SWM, for example by installing or modifying rules in the switches flow tables FT. In a first step all packet header information is encrypted that are used to match the rules using non-deterministic order-preserving encryption OPE. The OPE is for example shown in the non-patent literature of R. Agrawal, J. Kieman, R. Srikant, Y. Xu, "Order preserving encryption for numeric data", In: Conference on Management of Data (SIGMOD), 2004 and A. Boldyreva, N. Chenette, Y. Lee, and A. O'Neill, "Order-preserving symmetric encryption", In: Conference on Advances in Cryptology: The Theory and Applications of Cryptographic Techniques (EUROCRYPT), 2009. The OPE applied using an encryption key K. The non-deterministic order preserving encryption with partitioning into left and right set according to an embodiment of the invention is shown in more detail in FIG. 4.

The tenants/applications TA1, TA2, ..., TAN then send(s) a reconfiguration request RR with encrypted information to the reference monitor RM. The reference monitor RM checks without decrypting the information whether their reconfiguration request RR violates any of the prior installed network policies, which are also encrypted For this check the reference monitor RM possesses the current configuration of the switches SW1, SW2, ..., SWM in encrypted form. If the reference monitor RM does not detect any policy violation it issues a cryptographic token RT to the requesting tenant/application TA1, TA2, ..., TAN which the tenant/application TA1, TA2, ..., TAN can show to the switches SW1, SW2, ..., SWM to reconfigure the switches SW1, SW2, ..., SWM according to the reconfiguration request RR within a predetermined time frame. Of course it is possible that the tenant/application TA1, TA2, ..., TAN might reconfigure several switches SW1, SW2, ..., SWM with the same reconfiguration token RT by sending a corresponding reconfiguration message RMSG. This prevents for example the reference monitor RM to learn packet header information and the switches' flow tables FT.

Figure 2:
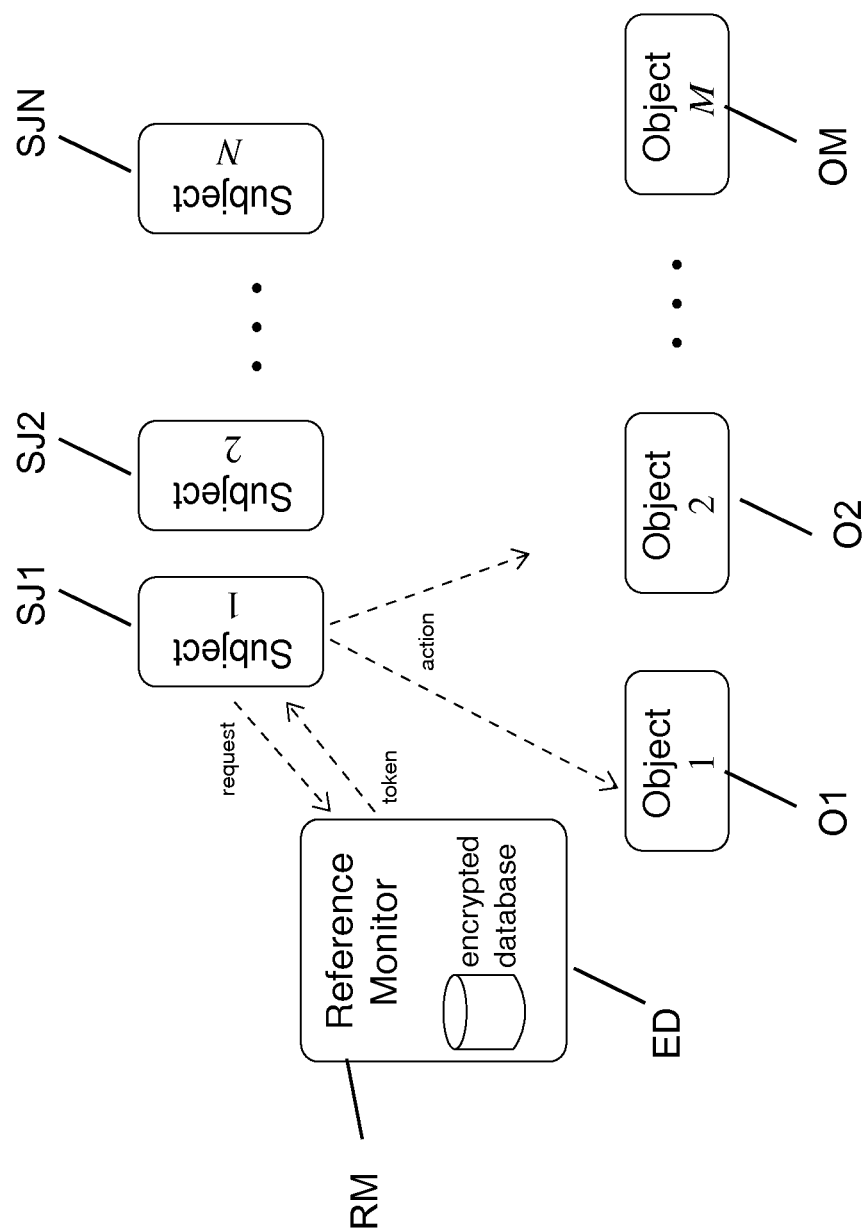
FIG. 2 shows schematically a principle of a system for performing a method according to an embodiment of the present invention.

FIG. 2 shows schematically the principle of a system for performing a method according to an embodiment of the invention. In FIG. 2 the system of FIG. 1 is generalized: Subjects SJ1, SJ2, SJN want to perform actions on objects O1, O2, ..., OM and a reference monitor RM is invoked to enforce policy compliance. This scheme can be used in a plurality of different application scenarios, such as multi-user database systems or the like. For instance the method according to embodiments of the present invention can be used for encrypting entries based on non-deterministic order preserving encryption ND-OPE to enhance the privacy of records stored within a multi-user outsourced database.

Figure 3:
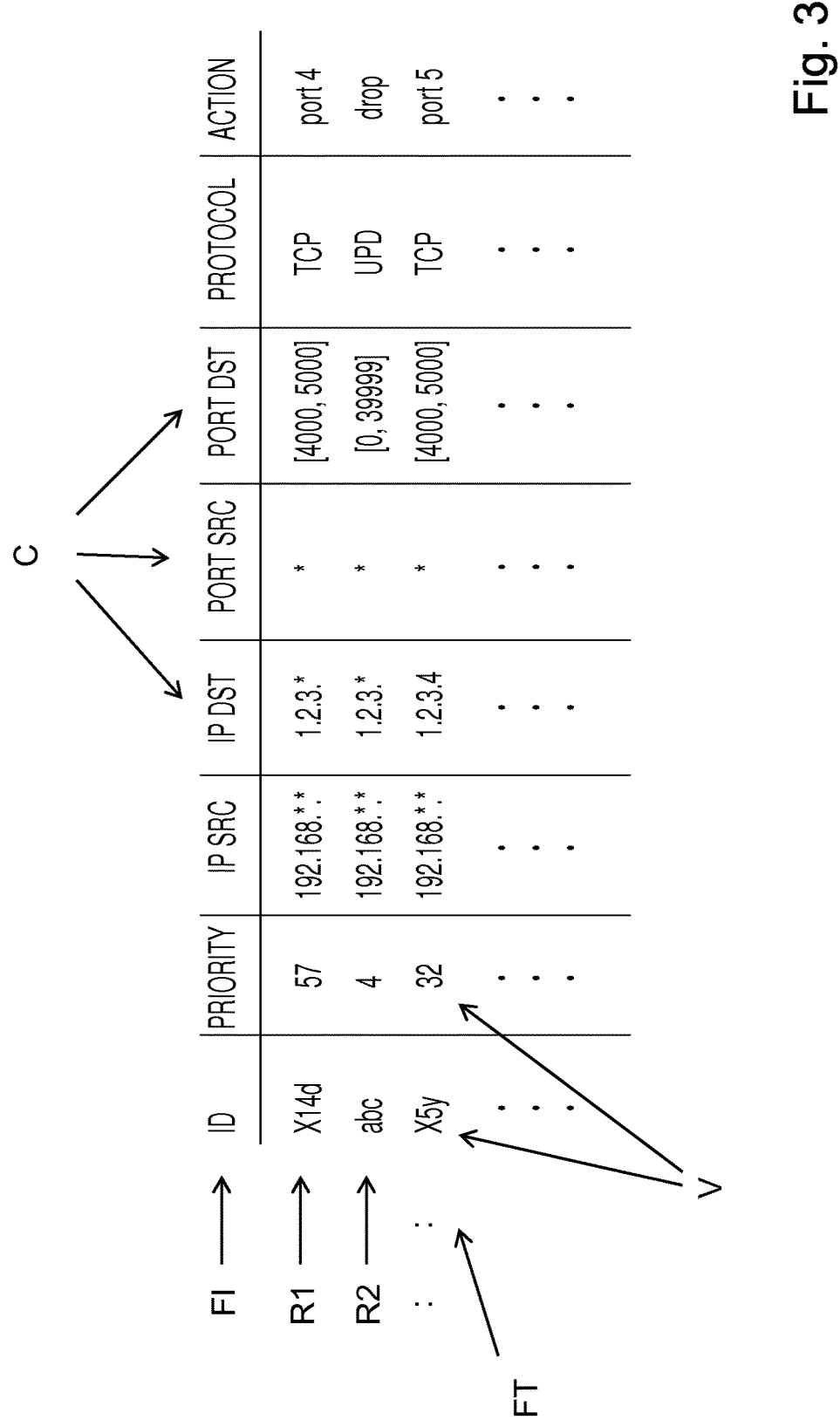
FIG. 3 shows a representation of information to be encrypted by a method according to an embodiment of the present invention.

In the following FIGS. 3-5 a system in form of a software defined network is assumed and for communication within the software defined networks the OpenFlow protocol is used.

In SDN, network applications (like routing and network traffic monitoring applications) at the control plane CP communicate with the switches SW1, SW2, ..., SWM at the data plane DP. In particular, an application reconfigures the switches SW1, SW2, ..., SWM, e.g., by installing, modifying, or deleting rules that are stored in the switches' flow tables FT and specify how network packets must be handled. Each rule R1, R2, ... comprises a matching predicate against which the header of incoming packets is matched and a set of actions, which are carried out on matching packets. The matching predicate of a rule R1, R2, ... is given by ranges of values of header fields, e.g. IP source address, IP destination address, IP protocol, etc. Examples of actions are dropping a network packet and forwarding it to a specified port of the switch SW1, SW2, ..., SWM. Since rules R1, R2, ... can overlap, i.e., the header of a network packet can match multiple rules R1, R2, ..., rules R1, R2, ... have priorities that are used to resolve such conflicts.

Other components of a rule R1, R2, ... are timeouts, which provoke the automatic deletion of a rule R1, R2, ... when, e.g., the switch, SW2, ..., SWM has not received any matching network packets for a specified period. The most prominent SDN standard used for the interaction between switches and network application is the OpenFlow protocol, which is for example disclosed in the non-patent literature of OpenFlow Switch Specification, Version 1.0.0, Wire Protocol 0x01, Dec. 31, 2009. It includes a specification of the exchanged messages for reconfiguring the state of a switch SW1, SW2, ..., SWM by installing or modifying a rule in the switch's flow table FT. The OpenFlow protocol also specifies the components of a rule R1, R2, ... flow table entry in the OpenFlow terminology and the fields of a rule's matching predicate. Here it is assumed that the embodiment of the present invention applies to SDN networks that use the OpenFlow protocol. However, the embodiments below are more general in the sense that they apply to SDN networks in general and do not rely on the OpenFlow protocol. Furthermore, it is not required that the data plane DP only comprises physical switches SW1, SW2, ..., SWM; the data plane DP can also contain software switches SW1, SW2, SWM and even virtual switches SW1, SW2, ..., SWM.

In the following, rules are assumed to be represented as tuples of the form (field$_1$, field$_2$, ..., field$_n$), where each field$_i$ specifies either a component of the rule's matching predicate, i.e., a range of values V of a header field or another rule component, e.g., the rule's priority, its action set, or a timeout value. Value ranges are assumed to be given as intervals [a, b], where a, b are nonnegative integers. If b<a then the interval is the empty set. A rule value v, like the rule's priority, can be represented as the singleton interval [v, v]. Furthermore the content of a switch's flow table is assumed to be represented at the control plane CP as a finite set of rules R1, R2, ..., where a unique identifier is associated to each rule R1, R2, .... That is, the control plane CP representation of a switch's flow table FT is a set of the form $\{(id_1, rule_1), \ldots, (id_m, rule_m)\}$. Such a set can also be understood as a table in a relational database with the columns ID, FIELD_1, ..., FIELD_n, where the ID column contains the keys of the table entries. Such a flow table FT is shown in FIG. 3 comprising rules R1, R2, ... for each rule and the columns C wherein the first column is the ID column and the other columns C are priority, IP source, IP destination, etc. being the field information FI. This flow table FT has then values V specifying the fields of the corresponding rules R1, R2. The intervals may be represented by wild cards like for the column C IP source. In FIG. 3 it is also assumed that a set of actions for a rule R1, R2, R3 is encoded as a single number.

The reference monitor RM has only access to the rules R1, R2, ... and to the switches flow table FT in the encrypted form. Encryption according to embodiments of the present invention is applied to the values V in the rule fields.

Figure 4:
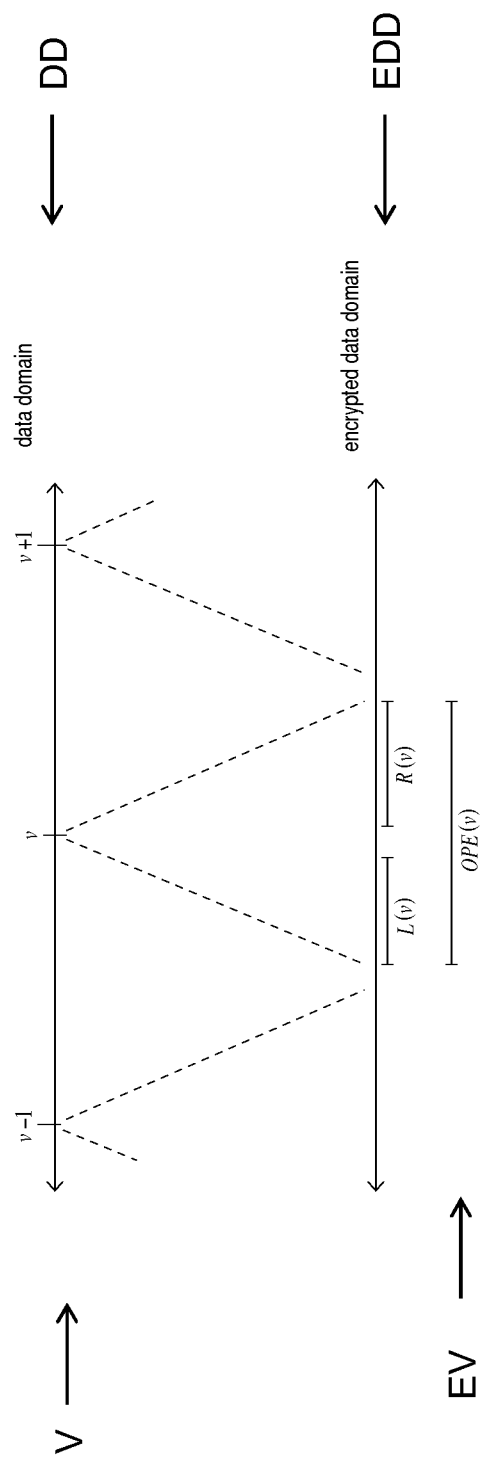
FIG. 4 shows schematically a principle for the encryption of values of a method according to an embodiment of the present invention.

FIG. 4 shows the principle for the encryption of values of a method according to an embodiment of the present invention. In FIG. 4 in more detail the portioning of encrypted values by the non-deterministic order preserving encryption ND-OPE is shown: In the following $OPE_K(v)$ denotes the set of values that decrypt the value v under the key K. With $OPE_K^{-1}(w)$ the value v is denoted, if it exists, such that w E $OPE_K(v)$. Additionally, the set $OPE_K(V)$ is partitioned into the sets $L_K(v)$ and $R_K(v)$ such that the elements in $L_K(v)$ are smaller than the elements in $R_K(v)$, which is illustrated here. To simplify notation the subscript K is omitted if the key K is clear from the context. Such a partitioning is only possible if the encryption is not deterministic, that is, the encryption of the same value under the same key will result in a different ciphertext, with high probability. In particular, for every v, the set $OPE_K(V)$ must contain at least two elements.

Let [a, b] be an interval. A big encryption of the interval [a, b] is an interval [x, y], where x∈L(a) and y∈R(b). Analogously, the small encryption of the interval [a, b] is an interval [x, y], where x∈R(a) and y∈L(b). The small and big encryption of intervals straightforwardly extends to hypercubes. A hypercube of dimension d≥1 is the Cartesian product of d intervals. This encryption allows to check whether a d-dimensional hypercube H is contained in another d-dimensional hypercube H' whenever once has a small encryption of H and big encryption of H' at hand. Let $[x_i, y_i]$ be a small encryption of the i-th interval $[a_i, b_i]$ of the hypercube H. Furthermore, let $[x'_i, y'_i]$ be a big encryption of the i-th interval $[a'_i, b'_i]$ of the hypercube H'. We have that H is contained in H' if and only if for all $i \in \{1, \ldots, d\}$, it holds that the interval $[x_i, y_i]$ is a subset of the interval $[x'_i, y'_i]$, i.e., $x'_i \leq x_i$ and $y_i \leq y'_i$ provided that the interval $[x_i, y_i]$ is nonempty.

Inequalities of the form a<b or a≤b can be checked on encrypted data when the inequality's left-hand side is encrypted by values from the OPE's L-partitions (i.e., L(a)) and the right-hand side by values from the OPE's R-partitions (i.e., R(b)). This extends to arbitrary Boolean combinations of inequalities.

In the following, it is assumed without loss of generality that all the fields of a rule are intervals, so that a rule can be seen as a hypercube and then the encryption of a rule is to encrypt each of the rule's intervals. This yields two encryptions of a rule, a "small rule encryption" (using the small encryption of intervals) and a "big rule encryption" (using the big encryption of intervals). Clearly both rule encryptions hide the concrete values of the fields' interval bounds. Moreover, whether a rule only matches network traffic of a certain type can be checked on encrypted data, it is assumed that a small encryption of the rule is at hand and a big encryption for the type of the network traffic.

FIG. 5 shows the encryption of a flow table encrypted with the method according to an embodiment of the present invention. In FIG. 5 an encryption of a flow table FT is shown. First, the left and right bounds of the intervals are separated in separate fields Z1, ..., Z9, ... when encrypting rules. The field names Z1, ..., Z9, ... are kept secret. Furthermore, the fields Z1, ..., Z9, ... are shuffled. More formally, rules R1, R2, ... are encrypted as follows: It is assumed that a rule R1, R2, ... consists of n fields. When S is a permutation of the integers 1 to 2n the a rule encryption of a rule R1, R2, ... with respect to S is a tuple $(z_1, z_2, \ldots, z_{2n})$ such that for every $j \in \{1, \ldots, 2n\}$, it holds that $z_j \in OPE(v_{s^{-1}(j)})$, where the rule's i-th field is the interval $[v_{2i-1}, v_{2i}]$, for $i \in \{1, \ldots, n\}$. This kind of encryption extends to the switches' flow tables FT.

In the following, variants of such encryptions are considered: (1) Different fields FIELD_1, ..., FIELD_n can be encrypted with different keys instead of using the same encryption key K for all fields FIELD_1, ..., FIELD_n (In this case, the encryption key K is a vector of OPE-keys, one OPE key for each field FIELD_1, ..., FIELD_n. We point out that encrypting the left and right bounds of an interval with different OPE keys is possible. Using different OPE keys for the interval bounds allows to smoothen the distribution of values between different fields in an encrypted rule or flow table FT); (2) An encrypted flow rule R1, R2, R3 or flow table FT can have multiple fields FIELD_1, ..., FIELD_n encrypting the same field FIELD_1, ..., FIELD_n with different OPE keys (For example, the left and right interval bounds of the IP source address of a flow rule R1, R2, R3 can be encrypted in multiple fields FIELD_1, ..., FIELD_n. Note that, according to 1, each of the fields FIELD_1, ..., FIELD_n can be encrypted by a separate OPE key K. Dummy fields can be added to an encryption and filled with some data values); (3) Each encrypted field FIELD_1, ..., FIELD_n must either only contain values from the left OPE partitions, i.e., for each data item x of this field, there is a value v such that $x \in L(v)$ or from the right OPE partitions, i.e., for each data item x of this field, there is a value v such that $x \in R(v)$.

Second, it is assumed that a policy compliance check of a request can be reduced to checking the truth of a Boolean combination of inequalities of the form A<B and A≤B. For example, for checking whether a flow rule R1, R2, R3 only matches network packets of certain type like the source IP address must be in a certain range or the protocol must be TCP, this reduces to the question whether a hypercube is contained in another hypercube. This further reduces to checking whether a conjunction of inequalities evaluates to true. For evaluating such inequalities on encrypted data, the following is required: for an inequality A≤B, A must be encrypted by a left OPE partition (i.e., the data item is in L(v), for some value v) and B must be encrypted by a right OPE partition (i.e., the data item is in R(v), for some value v); for an inequality A<B, A must be encrypted by a right OPE partition (i.e., the data item of is in L(v), for some value v) and B must be encrypted by a left OPE partition (i.e., the data item is in R(v), for some value v); the same OPE key must be used to encrypt the data items for A and B if they occur in an inequality A<B or A≤B.

When these requirements are satisfied, the Boolean combination on encrypted data can be evaluated. The equality can also be checked on encrypted data, with some additional requirements. The equation A=B is logically equivalent to the Boolean combination $A \leq B \wedge \neg A < B$. For checking equality on encrypted data, the Boolean combination $A \leq B \wedge \neg A' < B'$ can be used, where A and B' are encrypted by left OPE ¬partitions and A' and B are encrypted by right OPE partitions. The data items for A and A' can be encrypted by different OPE keys. Also the data items for A and B must be encrypted by the same OPE key. The same holds for A' and B'. Finally, the inequality A<B over encrypted data for A≤B can be used on unencrypted data. So, the reference monitor can only guess which fields contain data items from left or right OPE partitions.

The following compliance checks are performed as follows on encrypted data:

I. Does a given rule only match network packet headers of a specified region?

It is assumes here that the regions are specified by the policy; they are specified in a table similar to a flow table FT of a switch SW1, SW2, ..., SWM. On unencrypted data, this question reduces to the question whether a hypercube H is contained in some other hypercube H'. Here, H originates from the fields of the flow rule and H' originates from the regions for which the application is allowed to install flow rules. On encrypted data, this question can be answered by evaluating a conjunction of inequalities $x'_1 \leq x_1 \wedge \ldots \wedge x'_n \leq x_n \wedge y_1 \leq y'_1 \wedge \ldots \wedge y_n \leq y'_n$, where the unprimed variables refer to interval bounds of the hypercube H and the primed variables refer to interval bounds of the hypercube H'. It is assumed here that the hypercube H is not the empty set.

II. Does a given rule overlap with some rule in a flow table?

To check whether a rule R1, R2, ... overlaps with a rule R1, R2, ... in a flow table FT it has to be checked whether their matching predicates overlap. This reduces to the question whether the intersection of the hypercubes H and H' is nonempty, where H represents the matching predicate of the given rule R1, R2, ... and H' ranges over the matching predicates of the rules R1, R2, ... in the flow table FT. This further reduces to the questions whether the intersection of intervals $[a_i, b_i]$ and $[a'_i, b'_i]$ is nonempty, where the intervals $[a_i, b_i]$ originate from hypercube H and the intervals $[a'_i, b'_i]$ from the hypercube H'. The nonemptiness of the intersection of the intervals $[a_i, b_i]$ and $[a'_i, b'_i]$ can be checked by the Boolean combination of inequalities $(a'_i \leq a_i \wedge a_i \geq b'_i) \vee (a'_i \leq b_i \wedge b_i \leq b'_i)$ provided that the interval $[a_i, b_i]$ is nonempty. ∧

III. Does a given rule (partly) overwrite some rule in a flow table?
   This question is a variant of the question II, where the priorities of flow rules need to be compared, i.e. this is another inequality check.

IV. Does a given rule connect to some of the rules in a flow table?
   Answering this question reduces essentially to a combination of answering the questions I to III. In addition, the topology of the network may be taken into account in case the flow table FT is not explicitly specified in the request but implicitly given through the rule's action, e.g., forward matching packets to port 5.

Once the reference monitor RM processes the encrypted rules R1, R2, ..., and verifies that they do not violate any of the (encrypted) policies, the reference monitor RM can allow the installation of these rules R1, R2, ... at the designated switches SW1, SW2, ..., SWM. This is achieved by issuing a timestamped cryptographic token RT that the tenant/application TA1, TA2, ..., TAN can present to the switches SW1, SW2, ..., SWN and install the rules R1, R2, ... there. More specifically, let denote the encrypted flow rule to be installed at switch SWi. The reference monitor RM constructs token TOKEN consisting of "OK switch i tenant j"∥C∥T∥Sign(h("OK switch i tenant j" ∥C∥T)). Here, ∥ denotes message concatenation, h(•) is a cryptographic hash function, and T denotes the current timestamp. TOKEN is sent to the tenant/application TAj. The tenant/application TAj then can send TOKEN to switch SWi, which can verify that TOKEN is well formed, checks the authenticity of the signature of the reference monitor RM, and checks that the timestamp is fresh. If these verifications pass, switch SWi decrypts flow rule C and installs it.

The above embodiment according to FIG. 5 prevents an outsourced reference monitor RM from learning the actual header fields used to construct the flow rule R1, R2, ..., since this information is encrypted using order preserving encryption.

Clearly, since non-deterministic order preserving encryption ND-OPE is used, it is hard for the reference monitor RM to acquire the header information types simply by observing the query log with the database. However, the rules installation patterns might reveal information about "popular" header information, such as a popular port number, e.g., port 80. This leakage can be further hardened by obfuscating the distribution of encrypted data. This is achieved by requiring that the reference monitor RM processes rules and policies that are encrypted under different keys, which is described in the following:

At policy installation time, the policy administrator encrypts each policy several times using different keys, and sends all the variant encrypted policies to the reference monitor. Here, by changing the encryption key, the header types map to different encrypted columns in the table for the same policies that are encrypted with different keys. This prevents information leakage that can originate by observing the query hits per column in order to infer whether this column corresponds to an IP address or to a port. Different keys may be computed as follows: It is assumed that the policy administrator, tenants/applications TA1, TA2, ..., TAN, and the switches already pre-share a master key K. Given this, the ith encryption key K can be computed as follows: $K_i = H(K \| i)$, where H(•) is a hash function and ∥ denotes message concatenation. In the i-th epoch, the switches and the tenants/applications TA1, TA2, ... TAN use key $K_i$ for encryption and decryption. When the i-th epoch is over, the tenants/applications TA1, TA2, ... TAN and the switches update their key to $K_{i+1}$. Here, ithe columns encrypted using different keys will never collide with other columns. This prevents the case where a policy encrypted with key $K_j$ is matched to a rule R1, R2, ..., encrypted with key $K_i$. Here, when a tenant/application TA1, TA2, ... TAN wishes to install a rule R1, R2 at epoch i, it will use key $K_i$ to encrypt its flow rules R1, R2, ... under order preserving encryption.

To obfuscate similarities between different encrypted fields of the same data items, dummy items to an encrypted table, that the reference monitor stores, e.g., the encrypted flow table of a switch, can be added. However, some care needs to be taken so that these dummy elements do not affect the outcome of a request. One possibility is to add elements with randomly chosen data items and have additional fields that mark whether an entry is a dummy element or not; the policy can then filter on the non-dummy elements (this amounts to the checking of additional inequalities). Clearly, there is a tradeoff between the privacy enhancement and the computational complexity of processing a request.

Figure 6:
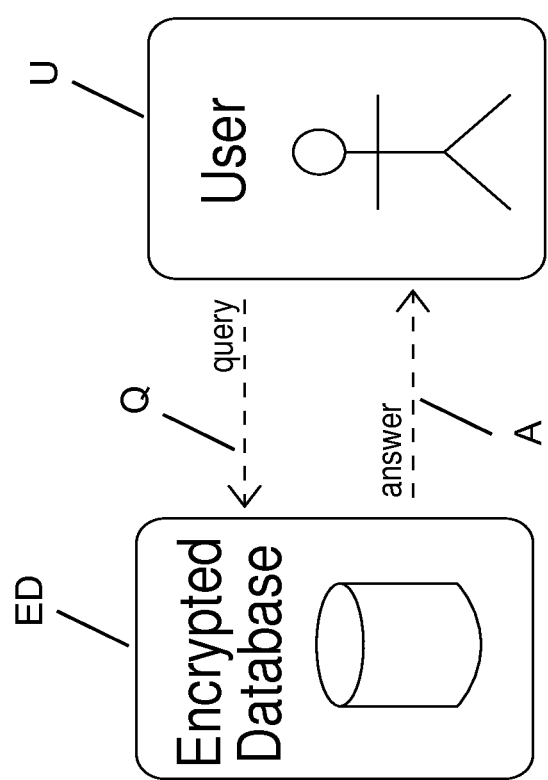
FIG. 6 shows schematically a further system for using a method according to an embodiment of the present invention.

FIG. 6 shows a further system for using the method according to an embodiment of the present invention. In FIG. 6 a scenario is described in which embodiments of the present invention can be used in outsourced multi-user database management systems. These systems typically comprise an encrypted data base ED fed with data of a user and which is running by an entity which might not be necessary trusted by a user U of the system, for example a cloud based database. Users U store and fetch records from the database ED by querying Q the database ED and the database ED answers A to the user U. The database ED processes encrypted input from the user U, for example sought the records or the like without learning considerable information about the records stored by the users U in the encrypted database ED. The present invention can be applied in outsource spatial databases where the database ED needs to check whether the reported location of users U force within a boundary which can be inherently achieved by embodiments of the present invention.

A further preferred embodiment comprises the following steps: (a) encrypting policies and flow rules using non-deterministic order preserving encryption based on partitioning into left and right sets; (b) sending the encrypted policies and rules to the outsourced reference monitor; (c) checking by the reference monitor whether the requested rules violate any encrypted policy; (d) in case a request is policy compliant, issuing a cryptographic token by the reference monitor which is bound to the encrypted flow rule; (e) presenting the cryptographic token to the tenant along with the encrypted rule to the switches; (f) checking by the switches the validity of the token for the rule, and if the verification passes, the switches decrypt the rule and install it.

Embodiments of the present invention can enable an encryption of entries using a special form of order preserving encryption to allow encrypting entries using a special form of order-preserving encryption OPE, i.e. non-deterministic order-preserving encryption with left and right sets, to allow the efficient outsourcing of reference monitors without leaking considerable information about the entries requested by the tenants in SDN networks and database systems. Further, embodiments of the present invention can enable issuance of cryptographic tokens that are tied to the requested flow rules in order to orchestrate access control in the SDN network and further enables/provides encrypting the same policy using different keys under order preserving encryption in order to hide the information type from the reference monitor.

Embodiments of the present invention can enable outsourcing of existing off-the-shelf reference monitors in a privacy-preserving manner without incurring any change in the implementation of the reference monitors. Embodiments of the invention can further ensure that the reference monitor can do its job and making access control decisions without learning any meaning for information about the specific rules that each tenant/installation wishes to install and/or modify.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for a first operating entity of one or more operating entities of a software-defined network (SDN) to configure or reconfigure a first network device of one or more network devices of the SDN, the method comprising:
   providing, by the one or more network devices, tuples of plaintext information, wherein each tuple comprises identification (ID) information, one or more fields, field information specifying the one or more fields, and values;
   encrypting, by the one or more network devices, at least the values of the tuples of plaintext information via non-deterministic order preserving encryption using at least one encryption key such that each plaintext value is encrypted into a respective set of encrypted values, wherein each respective set of encrypted values is portioned into a left set and a right set with each element in the left set being smaller than each element in the right set;
   storing, by the one or more network devices, the encrypted values by storing at least one of the left set or the right set for each respective set of encrypted values; and
   receiving, by the one or more network devices, from the first operating entity, a request relating to the encrypted information, wherein the request includes configuration or reconfiguration of the first network device by modifying a flow table of the first network device.

2. The method according to claim 1, wherein encrypting at least the values of the tuples of the plaintext information further comprises:
   encrypting the field information.

3. The method according to claim 1, wherein storing the encrypted values by storing at least one of the left set or the right set for each respective set of encrypted values further comprises:
   storing both the left set and the right set for each respective set of encrypted values.

4. The method according to claim 1, wherein for a first set of encrypted values, a left boundary and a right boundary of the left set are stored in different fields of the tuple corresponding to the first set of encrypted values, and/or a left boundary and a right boundary of the right set are stored in different fields of the tuple corresponding to the first set of encrypted values.

5. The method according to claim 1, further comprising:
   checking plausibility of the request, wherein one or more policies are also stored encrypted and used for defining plausibility.

6. The method according to claim 1, wherein encrypting at least the values of the tuples of plaintext information further comprises:
   encrypting different fields of the one or more fields of a first tuple using different encryption keys.

7. The method according to claim 1, wherein encrypting at least the values of the tuples of plaintext information further comprises:
   introducing dummy fields and/or dummy values.

8. The method according to claim 7, wherein the dummy fields and/or the dummy values are randomly chosen and comprise a dummy indication mark.

9. The method according to claim 1, wherein encrypting at least the values of the tuples of plaintext information further comprises:
   encrypting each value multiple times using a different encryption key each time.

10. The method according to claim 9, wherein the encryption keys are generated using a one way cryptographic function on a pre-shared common encryption key and epoch information in the form of a counter specifying the epoch when an operating entity switches to another encryption key or encryption key set.

11. The method according to claim 1, further comprising:
    processing the request so as to generate a result; and
    generating a configuration allowance token for the first operating entity based on the result to allow configuration or reconfiguration of the first network device.

12. The method according to claim 11, wherein the configuration or reconfiguration of the first network device is based on rules for configuring or reconfiguring the one or more network devices.

13. The method according to claim 11, wherein the configuration allowance token is a cryptographic time-stamped token configured to mutually authenticate the first operating entity and the first network device.

14. The method according to claim 1, further comprising:
performing a smaller-than operation or a smaller-than-or-equal-to operation on the encrypted information by comparing a first left set element with a first right set element.

15. The method according to claim 1, wherein the left set is provided in the form of a left interval and right interval, and/or the right set is provided in the form of a left interval and right interval.

16. The encrypting entity according to claim 1, wherein the left set is provided in the form of a left interval and right interval, and/or the right set is provided in the form of a left interval and right interval.

17. The method according to claim 1, wherein encrypting at least the values of the tuples of plaintext information further comprises:
encrypting boundaries of the left set of a first set of encrypted values using different encryption keys, and/or encrypting boundaries of the right set of the first set of encrypted values using different encryption keys.

18. A system comprising one or more network devices of a software-defined network (SDN), wherein the one or more network devices comprise one or more processors and one or more non-transitory computer-readable mediums having processor-executable instructions stored thereon, wherein the processor-executable instructions, when executed, facilitate:

providing tuples of plaintext information, wherein each tuple comprises identification (ID) information, one or more fields, field information specifying the one or more fields, and values;

encrypting at least the values of the tuples of plaintext information via non-deterministic order preserving encryption using at least one encryption key such that each plaintext value is encrypted into a respective set of encrypted values, wherein each respective set of encrypted values is portioned into a left set and a right set with each element in the left set being smaller than each element in the right set;

storing the encrypted values by storing at least one of the left set or the right set for each respective set of encrypted values; and receiving, from a first operating entity of the SDN, a request relating to the encrypted information, wherein the request includes configuration or reconfiguration of a first network device by modifying a flow table of the first network device.

* * * * *